United States Patent

Kimura

Patent Number: 6,000,804
Date of Patent: Dec. 14, 1999

[54] COLORED LIGHT RETROREFLECTIVE MATERIAL AND RETROREFLECTIVE HOLOGRAM RECONSTRUCTOR USING THE SAME

[75] Inventor: Asa Kimura, Kanagawa, Japan

[73] Assignee: Shiseido Co., Ltd., Tokyo, Japan

[21] Appl. No.: 09/161,501

[22] Filed: Sep. 28, 1998

[30] Foreign Application Priority Data

Sep. 30, 1997 [JP] Japan .................................. 9-282836
Jul. 3, 1998 [JP] Japan .................................. 10-189174

[51] Int. Cl.$^6$ .............................. G02B 5/128; G02B 1/10
[52] U.S. Cl. .............................. 359/536; 359/15; 359/22; 359/540; 359/585; 359/589
[58] Field of Search ..................................... 359/529, 530, 359/534, 536, 538–548, 577, 780, 584–589, 1–2, 9, 15, 22, 32

[56] References Cited

FOREIGN PATENT DOCUMENTS

| | | |
|---|---|---|
| 58-55024 | 12/1983 | Japan . |
| 62-133476 | 6/1987 | Japan . |
| 8-60627 | 3/1996 | Japan . |
| 63-38902 | 2/1998 | Japan . |

*Primary Examiner*—James Phan
*Attorney, Agent, or Firm*—Snider & Associates; Ronald R. Snider

[57] ABSTRACT

To provide a retroreflective material which has high utilization efficiency of light and which can give a reflected light to various color tones: the retroreflective material in accordance with the present invention, which comprises synthesizing an incident light by giving a phase contrast to a part of the incident light, and emphasizing a light component of specific wavelength region by interference and returning a colored light that the color tone is different from the incident light to the incident direction of the light, and to provide a hologram reconstructor which reflect the light to the almost the same direction as the incident direction, when the linear light that has regular directionality is irradiated, and which comprises graphic design function, decorating function and high forgery prevention property by using said retroreflective material as the hologram reconstructor: the retroreflective reconstructor in accordance with the present invention laminates said retroreflective material and a hologram reconstructor which reconstructs a three-dimensional image by laminating a hologram reconstructor and a reflective layer.

16 Claims, 5 Drawing Sheets

COLORED LIGHT RETROREFLECTIVE MATERIAL AND RETROREFLECTIVE HOLOGRAM RECONSTRUCTOR USING THE SAME

RELATED APPLICATIONS

This application claims the priority of Japanese Patent Application No. 9-282836 filed on Sep. 30, 1997 and Japanese Patent Application No. 10-189174 filed on Jul. 3, 1998, which are incorporated herein by reference.

FIELD OF THE INVENTION

The present invention relates to a retroreflective material, and in particular, to an improvement in graphical design function, decorating function and forgery prevention property of a colored light retroreflective material, which colors a returned light and a hologram reconstructor which is composed by using said retroreflective material.

BACKGROUND OF THE INVENTION

A retroreflective material is used for a traffic sign for identifying at night, clothes or the like. When a beam of light such as headlights of automobile is irradiated, a returned light can be emitted to almost the incident direction of the light even in the case where the beam of light is entered with respect to the retroreflective material at a little angle.

Namely, in the so-called specular reflection, a reflected light returns to the incident direction except that the beam of light enters perpendicular with respect to the specular surface, because the reflected light is generated in order that an angle of incidence and an angle of reflection becomes about the same.

Thereupon, as shown in Japanese Unexamined Patent Publication Sho 63-38902 or Japanese Unexamined Patent Publication Hei 8-60627, the so-called retroreflective material is used in general. Namely, the retroreflective material can return the light to almost the incident direction even when the incident light enters at a little angle, by arranging a microsphere whose particle diameter is approximately 30 to 80 $\mu$m and which have relatively high refraction index, onto a light reflective layer such as a metallic film.

Said retroreflective material is excellent in the point that the returning ratio to the incident direction is high, even when the light is entered at a little angle. However, the retroreflective is the same with the specular reflector in the point that the light, which is the same color tone with the incident light, is returned.

Therefore, a method for coloring the portion that the light goes through, with pigments or dyes which have high transparency, has been adopted to color this retroreflective material so far.

For example, a method for coloring an aluminium-evaporated film that is existed in a lower part of a glass microsphere or a method for coloring a glass microsphere itself, has been used. As the coloring agents, isoindolinone, copper chloride phthalocyanine, phthalocyanine, anthraquinone, thioindigo, or the like has been used. Also, as mentioned in Japanese Examined Utility Model Publication Sho 58-55024, a method for using a mica which have high reflectance as the reflective layer and mixing thereto a transparent coloring agent.

However, utilization efficiency of light is low and it is inevitable that chroma or lightness is lowered, because the light of a specific wavelength among the incident light is absorbed and a color is developed by its complementary color in the color developing mechanism of the conventional coloring agent. Also, it is necessary to use the coloring agent of high transparency to maintain utilization efficiency of light after coloring. Consequently, the coloring agents to be used are extremely limited. Further, the applications are also limited because there are the problems that light stability and heat stability of the coloring agents are bad. Furthermore, since the coloring agents to be used are limited, it is too much difficult to provide the retroreflective material with high graphical design function under the present circumstances.

SUMMARY OF THE INVENTION

In view of the foregoing problems of the prior art, an object of the present invention is to provide a retroreflective material which has high utilization efficiency of light and which can give a reflected light with various color tones. Further, another object of the present invention is to provide a hologram reconstructor, which have graphical design function, decorating function and high forgery prevention property and which reflects the light to the same direction with the incident direction, when a linear light which has a specific directionality is irradiated, by using said retroreflective material in the hologram reconstructor.

To attain the above-mentioned object, the retroreflective material in accordance with the present invention is characterized in that comprises synthesizing an incident light by giving a phase contrast to a part of the incident light, and emphasizing a light component of specific wavelength region by interference and returning a colored light that its color tone is different from the color tone of the incident light, to the incident direction of the light.

Namely, the present inventors utilize interference of the light for coloring a reflected light of the retroreflective material. In the retroreflective material, the incident light is refracted twice or more in the retroreflective material as is different from specular reflection in general.

Also, in the retroreflective material of the present invention, it is preferable to comprise a reflective substrate and a transparent microsphere that is arranged onto said substrate in order, and to arrange an interference substance layer, which produces a colored interference color, onto said reflective substrate.

Also, in the retroreflective material of the present invention, it is preferable to comprise a reflective substrate and a transparent microsphere that is arranged onto said substrate in order, and to arrange an interference substance layer onto an opposite face to the substrate of said transparent microsphere.

Also, in the retroreflective material of the present invention, it is preferable to use a metal oxide coated plate-like powder as the interference substance layer.

Also, in the retroreflective material of the present invention, it is preferable that said metal oxide coated plate-like powder is a titanium dioxide coated mica and/or a titanium lower oxides coated mica that the layer thickness of the titanium oxide is 40 nm or more.

Also, in the retroreflective material of the present invention, it is preferable that said reflective substrate has a color that is different from the color tone of the interference color of the titanium oxide coated mica.

Also, in the retroreflective material of the present invention, it is preferable that said metal oxide coated plate-like powder is a titanium composite oxide coated mica that has a different appearance color from the color tone of the interference color of the metal oxide coated plate-like powder.

Also, in the retroreflective material of the present invention, it is preferable to use a surface oxidizing metallic membrane as the interference substance layer.

Further, according to the inventor's examination, it becomes clear that combining said retroreflective material and a hologram reconstructor can display an interesting property.

Namely, as to the hologram reconstructor, a coherent light irradiates to some object and a reflected wave from the object is recorded with a photographic medium, The reflected wave from the object is referred to as an object wave in this place. When the object wave is recorded by a photographic medium, a mirror or the like is placed on the next to the object in order that a part of the light irradiated to the object is directly sent to a photographic medium without passing the object. This light is referred to as a reference wave. Thereupon, an interferogram that the object wave and the reference wave are overlapped is recorded in a photographic medium. A photographic medium respond only with respect to intensity of the light, but complete information about amplitude and phase of the object wave, nevertheless is contained in the interferogram.

This interferogram is completely different from the original object and is a small fringe irregular figure. However, a three-dimensional image of the original object is reconstructed in the case where the light is transmitted to the film which is recorded the interferogram.

A hologram film comprises a hologram layer and a reflective layer. The hologram layer is formed with a transparent synthetic resin film that have a hologram emboss, which is comprised of ruggedness for projecting a hologram by using interference of the light. The reflective layer is evaporated with a light reflective metal or a metal oxide of high refraction index. By laminating the hologram layer and the reflected layer, the incident light, which permit the transparent resin, is reflected at the reflected layer and hologram image is came into the surface due to ruggedness in the emboss of the hologram layer.

The hologram film which have the light reflective metal in the reflective layer, is used for a lot of packages, pamphlets, books, or the like, because the hologram film can display an excellent appearance with plenty of luster and can attract people's attention.

In particular, a hologram reconstructor is used for a credit card, a note used as money, a bond such as a certificate or the like for the purpose of preventing forgery. Because the hologram reconstructor costs too much for manufacturing and preparing, and requires a high-degree of technique for manufacturing, and is difficult to copy or forge.

Lately, a semitransparent hologram film and a transparent hologram film are taken to the market. Assuming that complete evaporation state of the light reflective metal is 100%, the reflective layer of the semitransparent hologram film is half-evaporated in the ratio of 10 to 20%. Also, the reflective layer of the transparent hologram film evaporates a metal oxide of high refraction index.

However, the reflective layer in the hologram generally uses aluminium as a light reflective metal. Consequently, a color of the whole part is silver in most cases. Also, the transparent or semitransparent hologram film is short of the color and lack graphical design function and decorating function.

Also, the technique for providing the hologram film with a color is disclosed in Japanese Unexamined Patent Publication No. Sho 62-133476. However, the technique disclosed therein printed a pattern onto a surface layer of a hologram layer by using an ordinary ink. Accordingly, the pattern is always captured in visual, whether the hologram is visible or invisible. Therefore, the hologram film has not been displayed enough effect for preventing forgery, because to give the hologram film with the pattern is not so much difficult and the pattern can be described with the materials which are available with ease, when one only have the technique for manufacturing the hologram.

Also, with the improvement of technology such as the advance of computer processing technique in recent years, it is not too much difficult to copy or manufacture the conventional hologram reconstructor in the status quo. Consequently, the hologram becomes worthless as compared with in those days that the hologram was begun to use.

The present inventors found that a hologram reconstructor that is laminated with the retroreflective material of the present invention can provide the hologram reconstructor with graphical design function, decorating function, and high forgery prevention property that the conventional hologram reconstructor has not possessed.

Namely, a retroreflective hologram reconstructor in accordance with the present invention is characterized in that comprises laminating said retroreflective material and a hologram reconstructor that reconstructs a three-dimensional image by laminating a hologram layer and a reflective layer.

Also, in the retroreflective hologram reconstructor which laminates the retroreflective material of the present invention and a hologram reconstructor which reconstructs a three-dimensional image by laminating a hologram layer and a reflective layer, it is preferable that said retroreflective material comprises an interference substance layer which produces a colored interference color and a transparent microsphere which is arranged onto said interference substance layer in order.

Also, in the retroreflective hologram layer of the present invention, it is preferable to describe a letter or a figure with the difference of the interference color, which displays with respect to the incident light by operating the position of the interference substance.

Also, in the retroreflective hologram layer of the present invention, it is preferable that the letter or the figure described with the interference substance and the hologram image reconstructed with the hologram layer are different in each other.

BEST MODE FOR CARRYING OUT THE INVENTION

Preferable embodiments of the retroreflective material of the present invention and the hologram reconstructor using the same are explained in detail, respectively.

PETROREFLECTIVE MATERIAL

Embodiment 1-1

Figure 1:
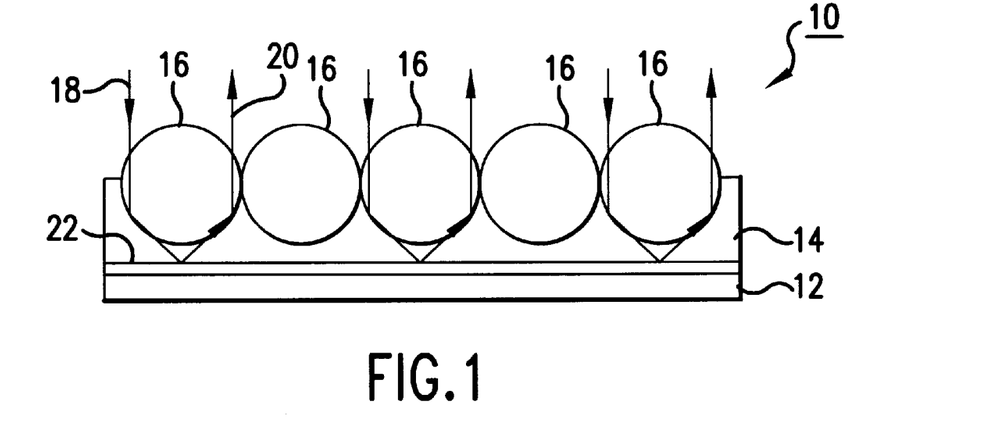
FIG. 1 is an explanatory view, which shows a general constitution of a colored light retroreflective material in accordance with one embodiment of the present invention.

FIG. 1 shows a general constitution of a retroreflective material in accordance with one embodiment of the present invention.

In FIG. 1, a resin layer 14 is arranged onto a reflective substrate 12 in a retroreflective material 10. A large number of transparent microsphere 16 whose particle diameters are 30 to 80 $\mu$m and which are made of glass or the like, are arranged onto the surface layer side of the resin layer 14 in order.

An incident light 18 entered from the outside travels into the microsphere 16. And, at least a part of the incident light 18 travels from the transparent microsphere 16 to the outside by reflecting at the reflective substrate 12 through the resin layer 14 and by returning to the microsphere 16 again. Since a face of the inicrosphere 16, which projects to the outside, have a spherical surface, a reflected light 20 can returns to the incident direction even when the incident angle is slightly fluctuated.

A characteristic of the present invention is to use interference of the light to color said reflected light 20. In this embodiment, for that purpose, an interference substance layer 22 is arranged onto the reflective substrate 12.

As a result, the incident light 18 generates interference of the light at the interference substance layer 22 and the reflected light 20 displays a color tone of the wavelength that is emphasized with interference action.

Figure 2:
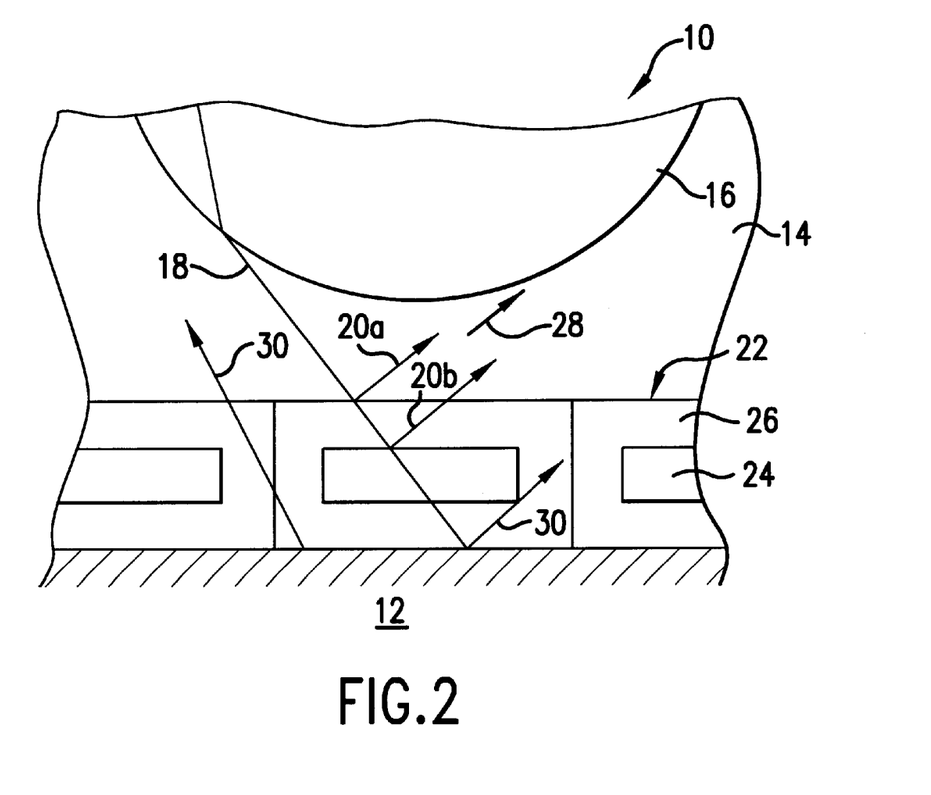
FIG. 2 is an explanatory view, which shows a main constitution of a colored light retroreflective material in accordance with the embodiments 1-1, 1-2, 2-1, and 2-2 of the present invention.

Namely, as shown in FIG. 2, the interference substance layer 22 is composed of a titanium dioxide coated mica 22 in this embodiment. The titanium dioxide coated mica 22 is composed of a scaly mica 24 and a titanium dioxide layer 26 which is coated onto the mica 24. A part 20a of the incident light 18 is reflected at the surface of the titanium dioxide layer 26 and another part 20b of the incident light 18 is reflected at the boundary surface between the mica 24 and the titanium dioxide layer 26. Optical path difference, which is approximately twice of the titanium dioxide layer 26, exists between the reflected lights 20a and 20b. Among a wavelength component of the reflected lights 20a and 20b, the component that optical path difference is multipled by an odd number of a half wavelength is amplified and the component that optical path difference is multipled by an integral number of a wavelength is attenuated. As a result, a reflected interference light 28, which has a desired color tone, can be obtained by adjusting the layer thickness of the titanium dioxide layer 26. This colored reflected interference light 28, as shown in FIG. 1, returns to almost the same direction as the optical path of the incident light by the transparent microsphere 16.

In this embodiment, the color reflected interference light 28 is strongly observed from the returning direction of the light in the case where reflectance with the titanium dioxide coated mica 22 is raised.

As mentioned above, according to the colored light retroreflective material in accordance with this embodiment, utilization efficiency of light is extremely high, because interference action is utilized for giving a color tone of the returning light. Also, an arbitrary color tone can be obtained by adjusting the layer thickness of the titanium dioxide. Further, the present invention can make a colored light retroreflective material which is excellent in heat resistance and weathering resistance, because the material, which generates interference color, is the titanium dioxide coated mica that is an optically stable inorganic material.

In the titanium dioxide coated mica, the following relations are recognized between the layer thickness of the titanium dioxide and its interference color.

TABLE 1

| Interference color | Geometrical thickness of titanium dioxide (nm) |
|---|---|
| Silver | 20 to 40 |
| Gold | 40 to 90 |
| Red | 90 to 110 |
| Violet | 110 to 120 |
| Blue | 120 to 135 |
| Green | 135 to 155 |
| Gold (secondary order) | 155 to 175 |
| Violet (secondary order) | 175 to 200 |

Accordingly, geometrical layer thickness of the titanium dioxide coated mica which is used in the present embodiment is preferably 40 nm or more.

Embodiment 1-2

In FIG. 2, when light transmittance of the titanium dioxide coated mica 22 is adjusted and reflectance based on the reflective substrate 12 is increased, a reflected light 30 from the reflective substrate 12 can be observed. Consequently, the color tone of the returned light 20 is synthesized with the colored reflected interference light 28 and the reflected light 30, which reflects the color tone of the reflective substrate 12, when the reflective substrate 12 is a colored. In this case, the colored reflected interference light 28 is hardly observed from the direction except returning to the incident direction and the color tone of the reflective substrate 12 is observed. For example, when a beam such as headlights of automobile is entered, the light observed from the light source direction and the light observed from the other direction can be observed with the different color tone in each other.

Embodiment 1-3

Figure 3:
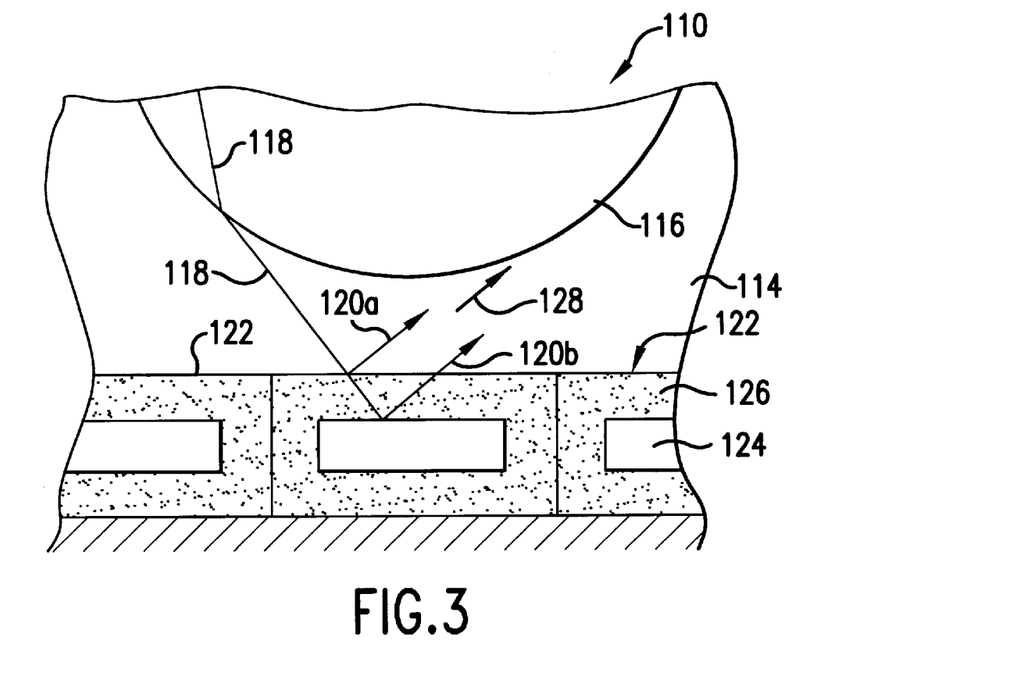
FIG. 3 is an explanatory view, which shows a main constitution of a colored light retroreflective material in accordance with the embodiments 1-3 and 2-3 of the present invention.

In FIG. 3, a colored light retroreflective material in accordance with embodiment 1-3 of the present invention is described. The parts, which correspond to the parts in the embodiment 1-1 is indicated by the same numerals added by the numeral 100, and explanation thereof will be omitted.

A characteristic in the present embodiment is to use a color titanium composite oxide coated mica as an interference substance 122.

In this case, as like the embodiment 1-2, a returned light 128 is observed by synthesized with the color tone of a composite oxide 126 and the interference color based on optical path difference by the composite oxide layer. On the other hand, the color tone that is observed from excluding the light source direction, become the color tone of the original composite oxide coated mica 126.

Embodiment 1-4

Figure 4:
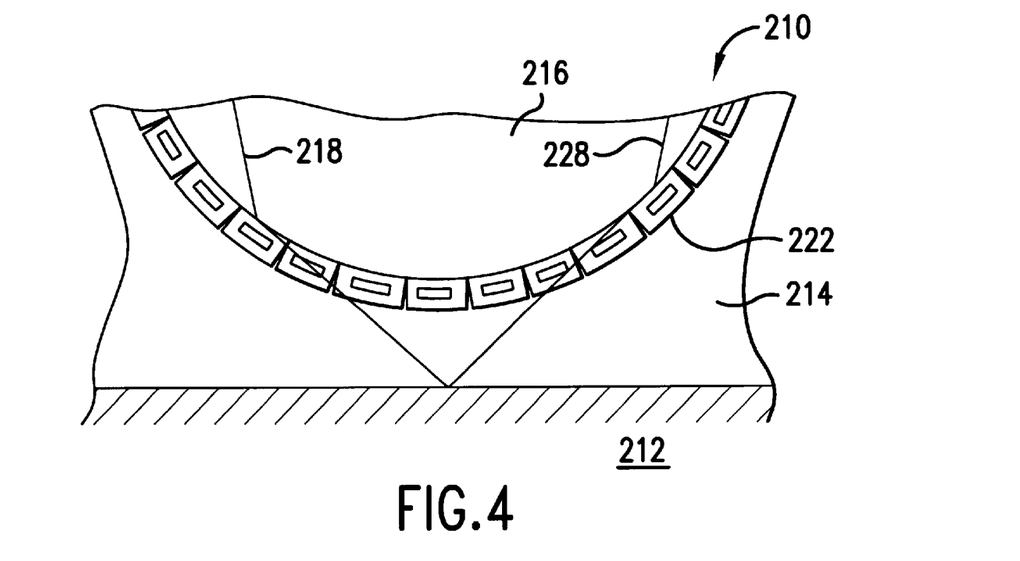
FIG. 4 is an explanatory view, which shows a main constitution of a colored light retroreflective material in accordance with the embodiments 1-4 and 2-4 of the present invention.

In FIG. 4, a main constitution of a colored light retroreflective material in accordance with the embodiment 1-4 of the present invention is shown. The parts, which correspond to the parts in FIG. 2 is indicated by the same numerals added by the numeral 200, and explanation thereof will be omitted.

In a colored light retroreflective material 210 shown in FIG. 4, an interference substance 222 is adhered to the buried face of a resin layer 214 that a transparent microsphere 216 is buried. As the interference substance to be adhered, as mentioned above, an interference titanium dioxide coated mica or the like, or a color composite oxide coated mica can be used.

In this case, a reflected light 228 is determined whether an incident light 218 is returned by repeatedly reflecting in the transparent microsphere 216 and the interference substance layer 222 based on refractive index difference between the transparent microsphere 216 and the interference substance 222, or whether the incident light 218 is returned by reflecting at a reflective substrate 212.

A colored returned light can be obtained even when the incident light goes through the interference substance layer 222 and is reflected by the reflective substrate 212, because the so-called transmissive interference light is generated at the time that the incident light goes through the interference substance layer 222.

Embodiment 1-5

Figure 5:
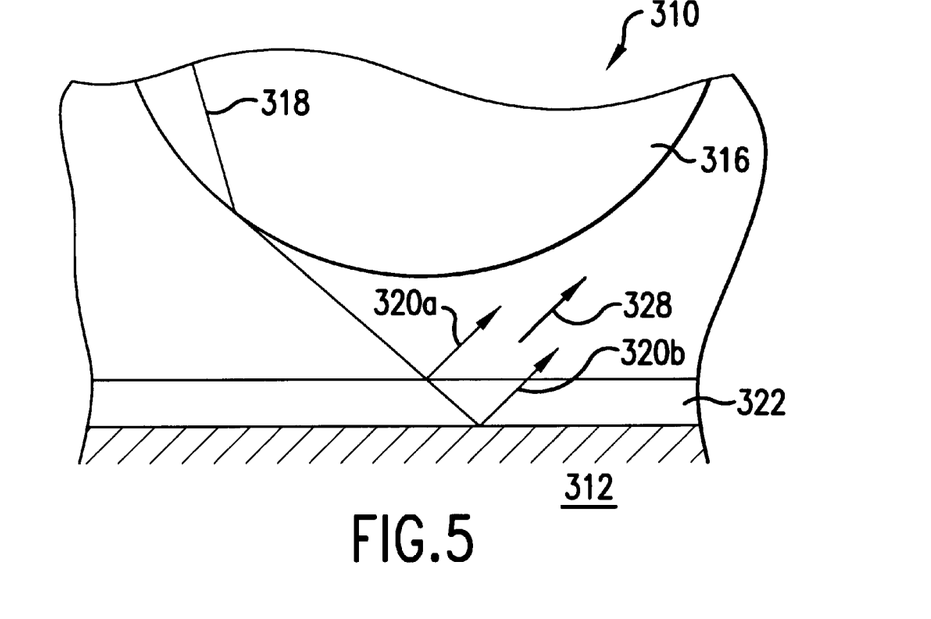
FIG. 5 is an explanatory view, which shows a main constitution of a colored light retroreflective material in accordance with the embodiments 1-5 and 2-5 of the present invention.

In FIG. 5, a main constitution of a colored light retroreflective material in accordance with the embodiment 1-5 of the present invention is shown. The parts, which correspond to the parts in FIG. 2 is indicated by the same numerals added by the numeral 300, and explanation thereof will be omitted.

In a retroreflective material 310 shown in FIG. 5, an interference substance layer 322 is directly arranged onto a reflective substrate 312. Then, a specific color tone can be obtained by interference action of a reflected light 320a, which is reflected at the surface of the interference substance layer 322 and a reflected light 320b that is reflected at the reflective substrate 312.

Embodiment 1-6

Figure 6:
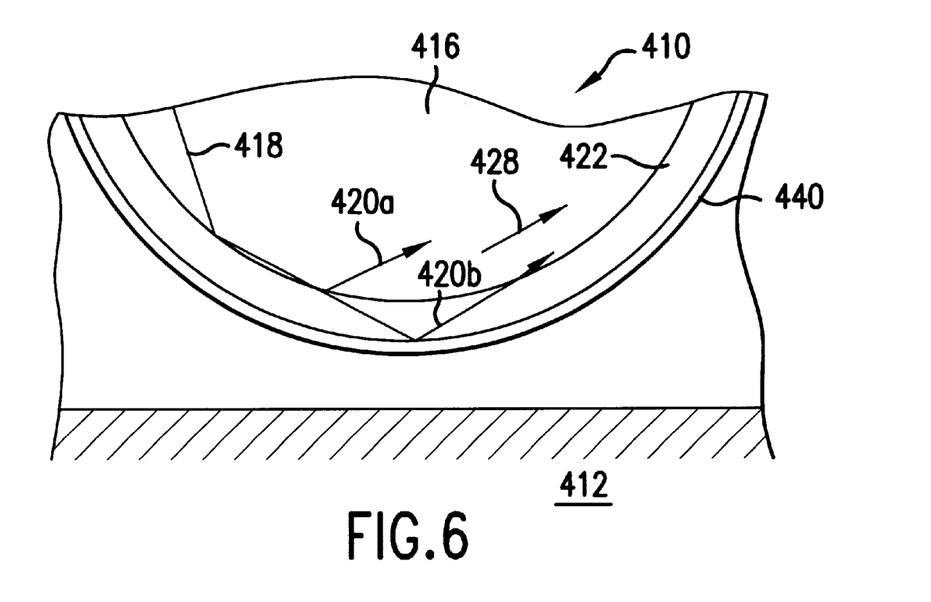
FIG. 6 is an explanatory view, which shows a main constitution of a colored light retroreflective material in accordance with the embodiments 1-6 and 2-6 of the present invention.

In FIG. 6, a main constitution of a colored light retroreflective material in accordance with the embodiment 1-6 of the present invention is shown. The parts, which correspond to the parts in FIG. 2 is indicated by the same numerals added by the numeral 400, and explanation thereof will be omitted.

In a colored light retroreflective material 410 shown in FIG. 6, an interference substance layer 422 is formed onto the buried face of a resin layer 414 that a transparent microsphere 416 is buried. In this case, a reflective layer 440 is arranged on the periphery of the interference substance layer 422. Accordingly, a specific color tone can be obtained by interference action of a reflected light 420a that is reflected at the boundary surface between the transparent microsphere 416 and the interference substance layer 422, and a reflected light 420b, which is reflected at the reflective layer 440.

As the interference substance used in the embodiments 1-1 to 1-4, it is preferable to use the titanium dioxide coated mica, which is typical of the coherent plate-like powder.

As the plate-like powder which is a nucleus of the coherent plate-like powder, for example, powders such as metal-aluminium, metal titanium or stainless; an inorganic plate-like oxide such as plate-like iron oxide, plate-like silica, plate-like titanium oxide or plate-like alumina, layer-like compounds such as muscovite, biotite, sericite, kaolinite or talc, or an organic high polymerized foil such as PET resin film or acrylic resin film is included. However, the plate-like powder used in the present invention is not limited to these powders. It is preferable to use the plate-like powder that has light transmittance in order to improve utilization efficiency of light. Also, a particle diameter of the plate-like powder, which is used in the present invention, is not limited in particular. However, the powder whose diameter is preferably 1 to 200 $\mu$m, and more preferably, is 10 to 120 $\mu$m, and which is flat, is easy to display an excellent luster and interference color.

For the purpose of giving an interference color to these plate-like powders, it is general to coat a metal oxide onto the surface of the plate-like powder. Examples of the metal oxide include titanium dioxide, iron oxide, titanium lower oxides, zirconium oxide, silicon oxide, aluminium oxide, cobalt oxide, nickel oxide, cobalt titanate or the like, the composite oxide such as $Li_2CoTi_3O_8$ or $KNiTiO_x$; or the mixed compounds thereof However, the metal oxide is not limited to these compounds as long as the metal oxide can develop an interference color. A method for coating these metal oxides onto the plate-like powder can be effected by the method to heat or decomposition with neutralization an organic salt or an inorganic salt of these metal oxides or by evaporation coating method such as CVD or PVD.

Surface treatment can be effected on the surface of these coherent plate-like powders with the organic or inorganic compound as occasion demands. Further, the application of the coherent plate-like powder used in the present invention is not restricted in particular. Combination with a conventional coloring agent or adding order can be adopted at well as long as the interference color is developed.

Also, as the interference substance layer used in the embodiments 1-5 and 1-6, a metal film, which has an interference color obtained by oxidizing the surface of the metal film, can be used. The metal film is manufactured by the method such as a method for anodizing metal aluminium, metal titanium or stainless film, a method for coating the metal oxide which can develop the interference color and which is prepared with sol-gel process; a method that an alkoxide of a metal, which can develop the interference color, is coated to the metal film, and followed by thermolyzing the metal film; or evaporation coating method such as CVD or PVD.

A colored retroreflective material in accordance with the present invention, which is colored with the interference color and is excellent in utilization efficiency of light, can provide a high graphical design function to daily necessaries such as marking film, shoes, bag, headgear (i.e., cap, hat or else) or clothes, furniture, electrical appliances, building, automobile, bicycle, printed matter, or molded articles such as paper, plastic or metal. Also, when the colored light retroreflective material in accordance with the present invention is used in such products, the colored light retroreflective material is very useful for preventing forgery.

Examples of the retroreflective material in accordance with the present invention will be explained in the following.

First, a manufacturing process of the coherent plate-like powder that is preferably used in the present invention will be shown.

Manufacturing Example 1-1

Mica (50 parts by weight) was added to ion-exchanged water (500 parts), and the mixture was sufficiently stirred and dispersed in uniform. 40 wt % titanyl sulfate solution (208.5 parts) was added to thus obtained dispersion and the mixture was heated and boiled for 6 hours while stirring. After leaving and cooling the mixture, the mixture was filtered and washed with water. Then the mixture was burned at 900° C., thereby yielding a titanium dioxide coated mica (90 parts) which has green interference color. The titanium dioxide coated mica obtained by this manufacturing example 1-1 can be used in the above-mentioned embodiments 1-1, 1-2 and 1-4.

Manufacturing Example 1-2

Mica (50 parts) was added to ion-exchanged water (500 parts), and the mixture was sufficiently stirred and dispersed in uniform. 40 wt % titanyl sulfate solution (312.5 parts) was added to thus obtained dispersion and the mixture was heated and boiled for 6 hours while stirring. Then the mixture was burned at 900° C., thereby yielding a mica coated with titanium dioxide (100 parts) which has green interference color. Then, metal titanium (1.2 parts) was mixed with thus obtained titanated mica (100 parts). The mixture was reduced with heating for 4 hours at 800° C. in a degree of vacuum equal to or less than $10^{-3}$ Torr. After cooling the mixture, titanium lower oxides/titanium dioxide coated mica (101.2 parts), whose appearance and interference colors are iridescent luster and vivid blue green, was obtained. The titanium lower oxides/titanium dioxide coated mica obtained by this manufacturing example 1-2 also can be used in the abovementioned embodiments 1-1, 1-2 and 1-4. In particular, a returned light that has a clear color tone can be obtained.

Manufacturing Example 1-3

Titanated mica (Iriodin 235) manufactured by Merck Corp. of Germany (100 parts) was reduced for 4 hours at 800° C. under an air stream of ammonia gas with the flow velocity of 3L/min. After cooling the mixture, titanium oxinitride/titanium dioxide coated mica (98.5 parts), whose appearance and interference colors are iridescent luster and vivid blue green, was obtained. The titanium oxinitride/titanium dioxide coated mica obtained by this manufacturing example 1-3 also can be used in the above-mentioned embodiments 1-1, 1-2 and 1-4. In particular, a returned light that has a clear color tone can be obtained.

Manufacturing Example 1-4

Green interference titanated mica (100 parts) obtained by the manufacturing example 1-2 was added to ion-exchanged water (200 parts), and the mixture was stirred and dispersed in uniform. 10% cobalt chloride solution (110 parts) was added to thus obtained dispersion for 3 hours at 80° C., while keeping its pH 4 to 5 with 1M caustic soda solution. After the mixture was filtered and washed with water, hydrous cobalt oxide coated titanated mica (102 parts) was obtained by drying the mixture at 105° C. Then, thus obtained hydrous cobalt oxide coated titanated mica (100 parts) and lithium carbonate were mixed in uniform by a small-sized stirrer. The obtained mixed powder was put into a magnetic crucible and followed by burning the mixed powder for 4 hours at 900° C., thereby yielding $Li_2CoTi_3O_8$ coated titanated mica (105 parts).

The titanium composite oxide coated mica obtained by this manufacturing example 1-4 can be used in the above mentioned embodiments 1-3 and 1-4.

Manufacturing example 1-5

Mica (50 parts) was added to ion-exchanged water (500 parts), and the mixture was sufficiently stirred and dispersed in uniform. 2M titanyl sulfate (350 parts) was added to thus obtained dispersion and the mixture was heated and boiled for 3 hours while stirring. After leaving and cooling the mixture, it was filtered and washed with water, and then titanium dioxide coated mica (90 parts) was obtained by drying the mixture at 200° C. Thus obtained titanium dioxide coated mica (50 parts) was added to ion-exchanged water (500 parts), and the mixture was stirred and dispersed in uniform. 0.42M nickel chloride was (295 parts) was added to the obtained dispersion for 3 hours at 80° C. while keeping its pH 4 to 5 with 1M caustic soda solution. After the mixture was filtered and washed with water, hydrous nickel chloride titanated mica (54.8 parts) was obtained by drying the mixture at 105° C.

Thus obtained hydrous nickel chloride titanated mica and potassium chloride (2.75 parts) were mixed in uniform at a small-sized mixer. The mixed powder was put into a magnetic crucible and was burned for 3 hour at 900° C., thereby yielding a glossy powder (51.0 parts) which have vivid yellow appearance color and red interference color.

The titanium composite oxide coated mica obtained by this manufacturing example 1-5 can be used in the above mentioned embodiments 1-3 and 1-4.

Next, the present invention will be explained with referring to the examples.

EXAMPLE 1-1

Silicone resin solution was applied onto the whole part of polyester film whose thickness was 50 μm. A transparent glass microsphere that its refractive index was 1.9 and it had 200 to 250 meshes was scattered when the silicone resin solution was dried to the degree that the silicone resin solution was not flowed. After adhering and drying the transparent glass inicrosphere in single that its hemisphere might not be buried, the glass microsphere was provisionary adhered with heat treatment for 3 minutes at 120° C. A pattern was printed by screen printing onto the glass microsphere provisional adhesion surface that the abovementioned transparent glass microsphere was provisionary adhered to the film by transparent color screen printing ink which comprises green interference titanated mica of manufacturing example 1-1 according to the ratio of TABLE 2. Before the pattern was dried, nylon resin particle of 80 to 250 meshes was scattered, adhered and dried. Heat treatment was effected for 5 minutes or more at 140° C., thereby yielding a retroreflective pattern film (transcriptional film) that displayed green reflected light which was the same color with the interference color of green interference titanated mica.

TABLE 2

| | |
|---|---|
| Acrylic resin solution (45 w/w %) | 100 parts |
| Green interference titanated mica of Manufacturing Example 1-1 (particle size 10 to 60 µm) | 30 parts |
| Other additions | |

EXAMPLE 1-2

Silicone resin solution was applied onto the whole part of polyester film whose thickness was 50 µm. A transparent glass microsphere that its refractive index was 1.9 and it had 200 to 250 meshes was scattered when the silicone resin solution was dried to the degree that the silicone resin solution was not flowed. After adhering and drying the transparent glass microsphere in single that its hemisphere might not be buried, the glass microsphere was provisionary adhered with heat treatment for 3 minutes at 120° C. A pattern was printed by screen printing onto the glass microsphere provisional adhesion surface that the above-mentioned transparent glass microsphere was provisionary adhered to the film by transparent color screen printing ink according to the ratio of TABLE 3. Before the pattern was dried, nylon resin particle of 80 to 250 meshes was scattered, adhered and dried. Heat treatment was effected for 5 minutes or more at 140° C., thereby yielding a retroreflective pattern film (transcriptional film) that displayed blue green reflected light which was the similar color with the appearance color (interference color) of titanium lower oxides/titanium dioxide coated minca.

TABLE 3

| | |
|---|---|
| Acrylic resin solution (45 w/w %) | 100 parts |
| Blue green titanium lower oxides/titanium dioxide coated mica of Manufacturing Example 1-2 (particle size 10 to 60 µm) | 30 parts |
| Other additions | |

EXAMPLE 1-3

Silicone resin solution was applied onto the whole part of polyester film whose thickness was 50 µm. A transparent glass microsphere that its refractive index was 1.9 and it had 200 to 250 meshes was scattered when the silicone resin solution was dried to the degree that the silicone resin solution was not flowed. After adhering and drying the transparent glass microsphere in single that its hemisphere might not be buried, the glass microsphere was provisionary adhered with heat treatment for 3 minutes at 120° C. A pattern was printed by screen printing onto the glass microsphere provisional adhesion surface that the above-mentioned transparent glass microsphere was provisionary adhered to the film by transparent color screen printing ink which comprised a glossy powder of vivid yellow appearance color and red interference color according to the ratio of TABLE 4.

Then, aluminium powder of average particle diameter 20 µm was coated onto the printing surface with acrylic coating by an applicator whose clearance was 0.101 mm. Acrylic resin solution was further coated onto the printing surface, and nylon resin particle of 80 to 250 meshes was scattered, adhered and dried before the solution was dried. Heat treatment was effected for 5 minutes or more at 140° C., thereby yielding a retroreflective pattern film (transcriptional film) that displayed yellow appearance and red retroreflective light.

TABLE 4

| | |
|---|---|
| Acrylic resin solution (45 w/w %) | 100 parts |
| Glossy powder which have yellow appearance and red interference color of Manufacturing Example 1-5 (particle size 10 to 60 µm) | 30 parts |
| Other additions | |

EXAMPLE 1-4

100 g of transparent glass microsphere that its refractive index was 1.9 and it had 200 to 250 meshes was dispersed into 1000 ml of isopropyl alcohol and 150 g of titanium tetraisopropoxide solution was added to the dispersed solution. Then, 100 ml of the mixed solution of water/isopropyl alcohol (1:1) was dripped down at the velocity of 5 ml/min, while the dispersed solution was maintained at 30° C. After dripping the mixed solution, the mixture was stirred for 4 hours. Then, the mixture was separated by filtration and washed with water. A transparent glass microspliere which had yellow interference color was obtained by drying the mixture for 3 hours at 200° C. Then, silicone resin solution was applied onto the whole part of polyester film whose thickness was 50 µm. The transparent glass microsphere, which had yellow interference color and was manufactured in advance, was scattered when the silicone resin solution was dried to the degree that the silicone resin solution was not flowed. After adhering and drying the transparent glass microsphere in single that its hemisphere might not be buried, the glass microsphere was provisionary adhered with heat treatment for 3 minutes at 120° C. A pattern was printed by screen printing onto the glass microsphere provisional adhesion surface that the above-mentioned transparent glass microsphere was provisionary adhered to the film by transparent color screen printing ink which comprised titanated mica of manufacturing example 1-4. Before the pattern was dried, nylon resin particle of 80 to 250 meshes was scattered, adhered and dried. Heat treatment was effected for 5 minutes or more at 140° C., thereby yielding a retroreflective pattern film (transcriptional film) that displayed yellow reflected light.

In order to see a clearly interference color of the interference substance when a linear light is irradiated to the retroreflective material, the refractive index of transparent glass microsphere which is used in the retroreflective material is preferably from 1.7 to 2.2, and more preferably, is from 1.8 to 2.1, and the average diameter of one is preferably from 20 to 60 µm, and more preferably, is from 30 to 50 µm.

In the case of the transparent glass microsphere, which has bigger refractive index than 2.2 or smaller refractive index than 1.7, it is difficult to control a focus of the retroreflective material. So we can not see a clearly reflected light from interference substance in this case. Also in the case of using the transparent glass microsphere, which has smaller average diameter than 20 µm, the microsphere may be buried in a resin layer, and reduces the effective angle of incidence that the retroreflective material of the present invention is able to reflect a incident light to the nearly same course. Conversely, in the case of using the transparent glass microsphere which has bigger average diameter than 60 µm, it is difficult to control a focus, and leads to the problem that the ink enter the gaps among the above microsphere, and so. And in the case of using the transparent glass microsphere which has bigger average diameter than 60 µm, occurs problem that printing onto the above microsphere is hard, when a interference substance is printed by screen printing onto the glass microsphere like above mentioned examples.

In the case of using the PET film at the surface layer just like above examples, the thickness of PET film which is used in the retroreflective is preferably from 23 to 150 μm, and more preferably, is from 38 to 50 μm. In the case of Using the PET film, which has thicker thickness than 150 μm, it is difficult to control a focal length. In the opposite direction, the PET film, which has thinner thickness than 23 μm, is so soft that producing the retroreflective material of the present invention is difficult.

As aforesaid, when the retroreflective material of the present invention is used in clothes, furniture, and such products, it can exhibit efficacy for preventing forgery. The interference substance in the retroreflective material of the present invention is risen interference color at the time of a linear light which emits from a light source to a specific direction is irradiated. However, the directionality of the light radiated from the light source is not regular under normal light in general lighting such as sun light or fluorescent light, because the lights, which are entered into the retroreflective material of the present invention are entered from the various directions. Then the lights, which entered into the retroreflective material of the present invention from the various directions, interfere with each other. For that, to observe the interference color that is displayed by the interference substance is difficult. So it is hard to observe the interference color that is displayed by the interference substance except the direction from which linear light enters into the retroreflective material. Consequently the retroreflective material of the present invention is preferably to be composed that a letter or a figure which is described by using the interference color that is displayed by the interference substances appears at the time of the linear light is irradiated. And any product which is used the retroreflective material of the present invention can be discriminated between the original and the counterfeit to check up on the letter or the figure which appears at the time of the linear light is irradiated.

A letter or a figure is described with a difference of an interference color that displays with respect to a linear light by operating the position of the interference substance layer. Since there is a difference of the colors that the interference substance display under the normal light or linear light, a letter or a figure appears under the linear light on the retroreflective material of the present invention. In spite of the color of the interference substance or the color, which is mixed the color of the interference substance and the color of the reflective substrate, looks single color under the normal light. Additionally, we describe a letter or a figure by the color of the interference substance that is observed under the normal light and describe another one by the color of the interference substance that is observed under the linear light. In the case, we can observe a different letter or figure on the retroreflective material of the present invention under the normal light or linear light. So using the retroreflective material of the present invention in any product can improve graphical design function and preventing forgery.

As mentioned above, the retroreflective material of the present invention has a reflective ability. For that, when the retroreflective material of the present invention is used in any product, to copy the any product is very hard although used a copy machine. And the linear light is irradiated to the part, which is the retroreflective material of the present invention, of any product by using the linear light irradiation machine that proceeds linear light. Then any product, which is used the retroreflective material of the present invention, can be distinguished between the original and the counterfeit instantly. Because the retroreflective material of the present invention displays different color under the normal light or the linear light, it can check up on the letter, figure, or color which appears at the time of the linear light is irradiated.

As explained above, the colored light retroreflective material in accordance with the present invention can widely select the color tone and is excellent in utilization efficiency, because the material is made to give a color tone by interference action with the incident lights.

Also, in the present invention, the color tone, which was synthesized with the color of the substrate and the interference color, was observed from the returning direction of the incident light, and the color of the substrate was observed from the other direction, by using titanium dioxide coated mica or titanium lower oxides coated mica which has high light transmittance as the interference substance and by coloring the substrate. Accordingly graphical design function can be improved.

Also, in the present invention, the color tone, which was synthesized with the color of the composite oxide and the interference color was observed from the returning direction of the incident light, and the color of the composite oxide was observed from the other direction, by using titanium composite oxide coated mica as the interference substance. Accordingly graphical design function can be improved.

RETROREFLECTIVE HOLOGRAM RECONSTRUCTOR

Figure 7:
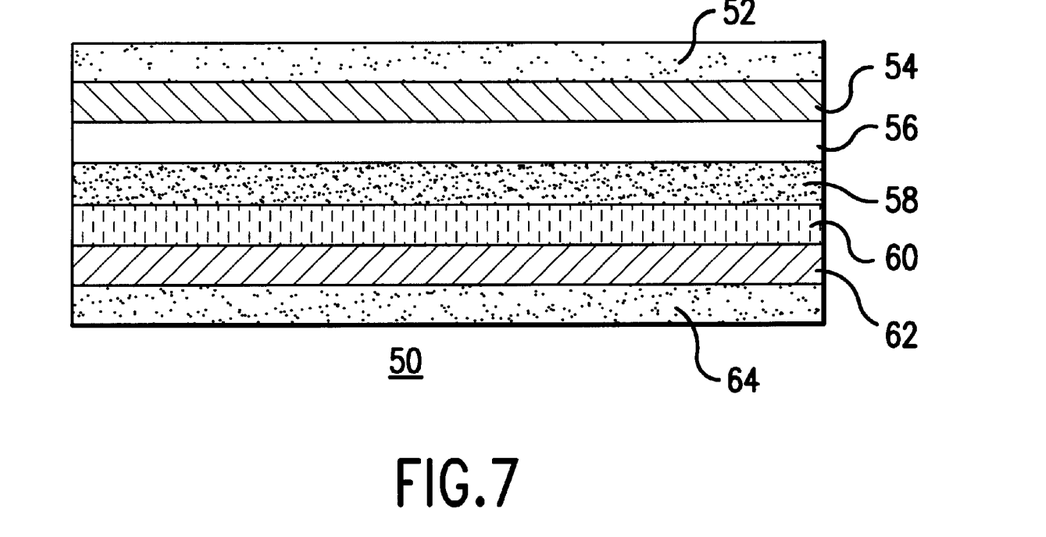
FIG. 7 is a schematic view, which shows an ordinary hologram reconstructor.

FIG. 7 is a schematic diagram of a general hologram reconstructor. A hologram reconstructor 50 in FIG. 7 is composed by laminating a carrier 52, a peeling layer 54, a protective layer 56, a hologram layer 58, a reflective layer 60, a coating layer 62, and an adhesive layer 64.

The hologram layer 58 and the reflective layer 60 are, as mentioned above, effected as the following. Namely, the light which transmits the hologram layer 58, which has a hologram embossed pattern, was reflected at the reflective layer 60 and a hologram image was reconstructed with the reflected light. There is a hologram reconstructor that is called as a total reflection hologram reconstructor (which can be seen in usual), a semitransparent hologram reconstructor, or a transparent hologram reconstructor. They are manufactured by adjusting the property of the material used in the reflective layer 60 and reflectance with respect to the incident light.

The carrier 52 supported the other layers to be laminated, and was peeled off from the other layers after transcribing the hologram reconstructor. As the materials that have strength, heat resistance, and surface properties to attain this object, for example, polyethylene terephthalate, polyester, polypropylene, or the like are selected.

The peeling layer 54 was used for facilitate to peel the carrier 52 from the subscribed hologram reconstructor. As the peeling layer, resin can be used in of course, but releasing agents may be used.

The protective layer 56 protected the hologram layer 58 and was selected from the translucent resin which have the properties such as abrasion resistance, stain resistance, or solvent resistance. The protective layer 56 can be used by combining with the peeling layer by considering the detachability from the carrier, or can be used by combining with the hologram layer by giving the hologram embossed pattern.

The coating layer 62 protected the hologram emboss and the reflective layer from abrasion, stain or the like, by coating the hologram emboss of the hologram layer 58 and the reflective layer. When the hologram reconstructor is stuck onto an article such as card or the like, an adhesive agent may be used without using the coating agent.

The adhesive layer 64 was arranged for sticking the hologram reconstructor onto an article. However, the adhesive layer may not be used, when the hologram reconstructor was used as a hologram sheet or a hologram film.

The present invention can be manufactured by the same materials and structures with the general hologram reconstructor shown in FIG. 7. The characteristic of the retroreflective hologram reconstructor in the present invention is to laminate a retroreflective material, which returns the incident light to the approach direction of the incident light, onto the hologram reconstructor shown in FIG. 7 and is the effect obtained thereby.

The hologram reconstructor used in the present invention further arranges the retroreflective layer onto the semitransparent hologram reconstructor, which is half-evaporated the light reflective metal onto the reflective layer, or the transparent hologram reconstructor, which uses metal oxide in the reflective layer, by the retroreflective material.

In the following, the hologram reconstructor in accordance with the present invention will be further explained in detail according to the embodiment. However, the hologram reconstructor in accordance with the present invention is not restricted to these embodiments, which are explained in the following.

Embodiment 2-1

Figure 8:
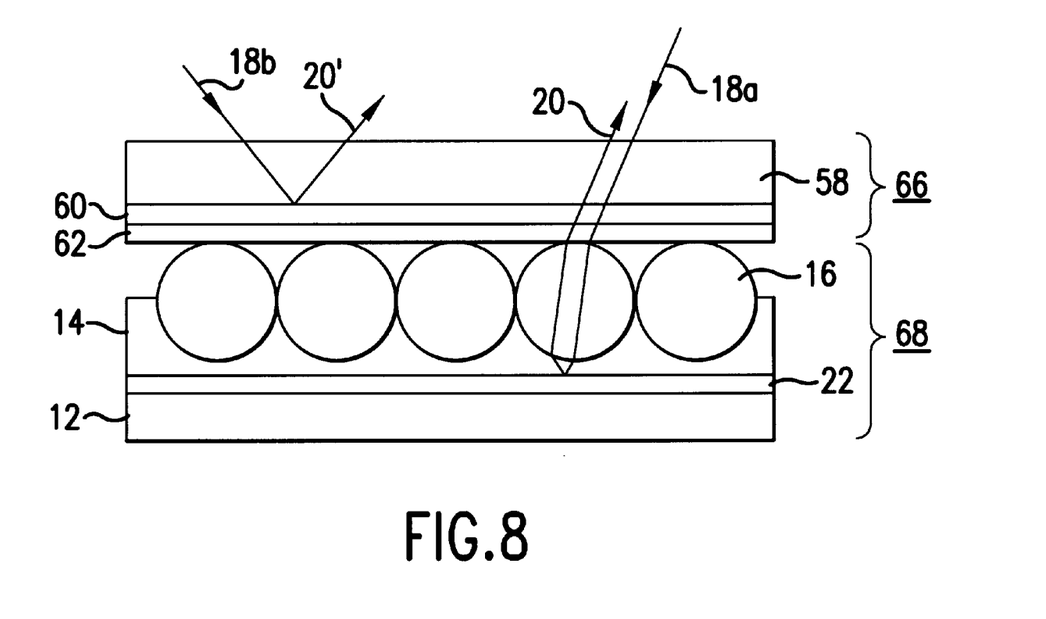
FIG. 8 is an explanatory view, which shows a general constitution of a retroreflective hologram reconstructor in accordance with one emobodiment of the present invention.

FIG. 8 is a general constitution of the retroreflective hologram reconstructor of one embodiment in accordance with the present invention. The embodiment 1-1 mentioned above is used as the retroreflective material used in the hologram reconstructor in accordance with the present invention. Consequently, the parts, which correspond to FIG. 2, are used the same numerals.

A retroreflective hologram reconstructor in FIG. 8 is laminated a retroreflective layer 68, which is made by the retroreflective material, onto a transparent hologram sheet 66, which laminates a hologram layer 58, which have hologram emboss, a reflective layer 60, and a coating layer. In the present embodiment, the hologram layer 58 is combined with the peeling layer 54 and the protective layer 56 in FIG. 7.

A part of the light 18b, which enters from the outside of the hologram sheet, become a reflected light 20' by transmitting the hologram layer and by reflecting at the reflective layer 60 which is provided in the hologram sheet 66. On the other hand, an incident light 18a which enters into the retroreflective layer 68 by transmitting the reflective layer 60 and the coating layer 62, become a reflected light 20 which is gone through to the outside by reflecting at a substrate 12 and entering into the hologram sheet 66 again. The hologram sheet 66 refracted and interfered these reflected lights 20 and 20' by the hologram emboss of the hologram layer, thereby a hologram image is caine to the surface.

In the retroreflective layer 68, a resin layer 14 is arranged onto the substrate 12 and a large number of transparent microsphere 16 whose particle diameters are 30 to 80 μm and which are made of glass or the like, are arranged on the surface layer side of the resin layer 14 in order. The light entered into the microsphere 16, which transmits the hologram sheet is gone through from the transparent microsphere 16 and the resin layer 14, and is reflected at the substrate 12. The light is returned again to the microsphere 16 and is gone to the outside. Since a face of the microsphere 16, which projects to the outside have a spherical surface, a reflected light 20 can returns to the incident direction even when an angle of incidence is slightly fluctuated.

A characteristic of the hologram reconstructor in accordance with the present invention is to use interference of the light in order to color said reflected light 20 of the incident light 18a. In this embodiment, for that purpose, an interference substance layer 22 is arranged onto the reflective substrate 12. As a result, the incident light 18a generates interference of the light at the interference substance layer 22 and the reflected light 20 displays a color tone of a wavelength that is emphasized with interference action.

As shown in FIG. 2, which explains the retroreflective material, the interference substance layer 22 in the retroreflective layer 68 is composed of a titanium dioxide coated mica 22 in this embodiment. The titanium dioxide coated mica 22 is composed of a scaly mica 24 and a titanium dioxide layer 26 which is coated onto the mica 24. A part 20a of an incident light 18 is reflected at the surface of the titanium dioxide layer and another part 20b of the incident light 18 is reflected at the boundary surface between the mica 24 and the titanium dioxide layer 26. Optical path difference, which is approximately twice of the titanium dioxide layer 26, exists between the reflected lights 20a and 20b. Among a wavelength component of the reflected lights 20a and 20b, the component that optical path difference is multipled by an odd number of a half wavelength is amplified and the component that optical path difference is multipled by an integral number of a wavelength is attenuated. As a result, a reflected interference light 28, which has a desired color tone, can be obtained by adjusting the layer thickness of the titanium dioxide layer 26. This colored reflected interference light 28, as shown in FIG. 8, returns to almost the same direction as the optical path of the incident light by a transparent microsphere 16.

In this embodiment, the color reflected interference light 28 is strongly observed from the returning direction, in the case where reflectance by titanium dioxide coated mica 22 is raised.

The retroreflective hologram reconstructor in the present invention, which have the constitution that the retroreflective layer 68 and the hologram sheet 66 was laminated, demonstrates the different action according to the irradiated light.

The lights, which are entered into the retroreflective hologram reconstructor are entered from the various directions, because the directionality of the light radiated from the light source is not regular under normal light in general lighting such as sun light or fluorescent light. Accordingly, a color by interference of the retroreflective material used in the retroreflective film is not observed even when a light entered into the retroreflective layer 68 exist, because the light is complicated by interaction with the reflected light 20' at the reflective layer 60 of the transparent hologram sheet. However, the hologram layer, even under normal light, can reconstruct the hologram image by making the light, which have a specific direction, interfere by the action such as refraction at the hologram emboss.

Figure 9:
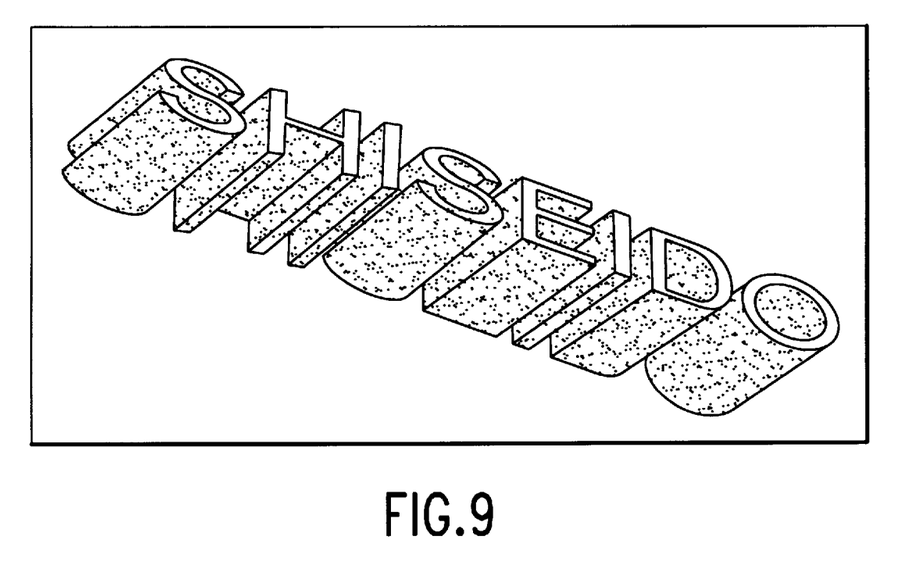
FIG. 9 is an image view, of the retroreflective hologram reconstructor in the present invention, which is observed under normal light.

Therefore, even if a letter or a figure is described by using the interference color that is displayed by the interference substances which are used in the retroreflective material, the letter or the figure is not identified and only the hologram image can be observed under normal light. Namely, the hologram image shown in FIG. 9 is observed, but the pattern described with the interference substance is not identified.

Figure 10:
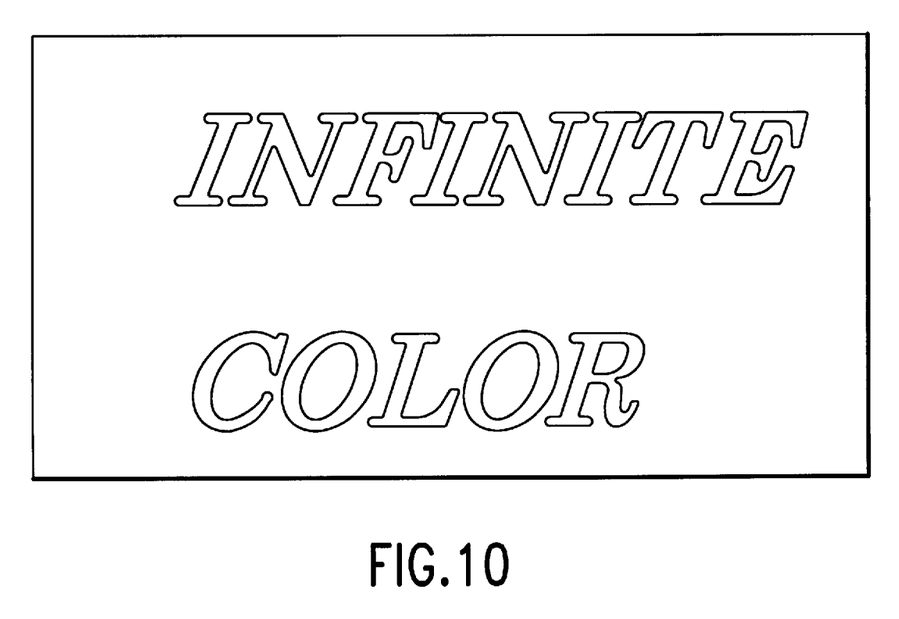
FIG. 10 is an image view of a retroreflective hologram reconstructor in the present invention, which is observed from the light source direction under a linear light.

However, when a linear light which emits from a light source to a specific direction is irradiated to the retroreflective hologram reconstructor in accordance with the present invention with stronger intensity than the marginal light, the interference substance displays the interference color by retroreflectivity of the retroreflective layer 68, only in the case where the pattern was observed from the irradiated direction of the linear light. Also, the letter or the figure described with the interference substance can be identified as shown in FIG. 10. In this place, however, the hologram image that was reconstructed by interference of the light with the hologram emboss of the hologram layer, is hardly observed. It seems that a faint light of hologram image, which is generated by interference, is negated by the reflected light, which strongly returns to the observed direction due to retroreflectivity of the retroreflective layer 68.

As mentioned above, in the retroreflective hologram reconstructor which can identify the pattern described with the arrangement of the interference substance by the interference color that is displayed by the interference substance only when the linear light is radiated, hologram image will be came into the surface under normal light such as sun light or lighting, in the case where the patterns described with the hologram image and the interference substance are different in each other. On the other hand, the pattern along with the color that is came into the surface by interference of the light is emphasized more than the hologram image, when the linear light is irradiated. Accordingly, it is possible to judge a genuine article or an imitation from the pattern that is came into the surface by using the linear light.

Therefore, the present inventors, to provide the hologram reconstructor with geographic design function, decorating function and high forgery prevention property, to utilize the retroreflective material which can give an interference color to the returning light by intervening the substance, which can produce a colored interference color in light path.

According to the retroreflective layer 68 in accordance with the present embodiment, utilization efficiency of light is extremely high, since interference action of light is used for giving a color tone to the returned light. Also, an any color tone can be obtained by adjusting the layer thickness of titanium dioxide. Further, the retroreflective layer that is excellent in heat resistance and durability can be obtained, because the substance to produce the interference light is titanium dioxide coated mica, which is a chemically and optically stable inorganic material.

Also, as mentioned above, the relations as like TABLE 1 can be recognized between the layer thickness and the interference color, when titanium oxide coated mica is used.

Therefore, the geometrical layer thickness of the titanium dioxide coated mica used in the present embodiment is preferably 40 nm or more.

In the present embodiment, though the substrate 12 is used in the retroreflective layer, but the substrate 12 used in the retroreflective hologram reconstructor of the present invention does not always have light reflectance. Because, the interference substance layer 22 arranged onto the substrate also have high reflectance. Accordingly, the effects mentioned above can be obtained even when the substrate 12 is not used.

Embodiment 2-2

In the embodiment 2-2, the retroreflective material described in the embodiment 1-2 is used as the retroreflective layer 68 in FIG. 8. The retroreflective layer is explained with referring to FIG. 1. When light transmittance of the titanium dioxide coated mica 22 is adjusted in this embodiment 2-2, a color of the substrate 12 can be observed. The reflected light 30 from the substrate can be observed, in the case where the substrate 12, which has high light reflectance, is used and the reflectance by the substrate is increased by adjusting light transmittance of the titanium dioxide coated mica 22. Consequently, the color tone of the returned light 20 is synthesized with the colored reflective interference light 28 and the reflected light 30, which reflects the color of the substrate, in the case where the substrate is a colored. In this case, the colored reflected interference light 28 is hardly observed from the direction except returning to the incident direction and the color tone of the reflective substrate 12 is observed. Therefore, the light observed from the light source which emits the linear light of a regular directionality and the light observed from the other direction are observed with the different color tone in each other.

For example, a pigment layer, which does not have reflectivity, is used as the substrate, the color of the pigment can be observed under normal light. Also, the interference color of the interference substance can be observed under the linear light. Accordingly, the hologram reconstructor that most of them are used to be limited to silver can be made a colorful.

Embodiment 2-3

In the embodiment 2-3, the retroreflective material described in the embodiment 1-3 is used as the retroreflective layer. The retroreflective layer is explained with referring to FIG. 3.

A characteristic in the present embodiment is to use a color titanium composite oxide coated mica as an interference substance 122.

In this case, as like the embodiment 2-2, a returned light 128 is observed by synthesizing with the color tone of a composite oxide 126 and the interference color based on optical path difference by the composite oxide layer. On the other hand, the color tone that is observed from excluding the light source direction of the linear light, become the color tone of the original composite oxide coated mica 126.

In this embodiment, the pattern of the appearance color and the pattern which is appeared by the interference color can be made a different in each other by considering the colors that are displayed with the appearance color and interference color of the interference substance to be used. Also, a hologram image can be came into surface on the reflected surface that has a single color in the direction except that the linear light is irradiated, when the interference substance that its appearance is the same and its interference color is different is used. However, the hologram reconstructor that is observed the different pattern by the interference color can be constituted, in the direction that the linear light is irradiated.

Embodiment 2-4

In the present embodiment, the retroreflective material described in the embodiment 1-4 is used as the retroreflective layer. The retroreflective layer is explained with referring to FIG. 4.

In a colored light retroreflective layer 210 shown in FIG. 4, an interference substance 222 is adhered to the buried face of a resin layer 214 that a transparent microsphere 216 is buried. As the interference substance to be adhered, as mentioned above, an interference titanium dioxide coated mica or the like, or a colored composite oxide coated mica can be used.

In this case, a reflected light 228 is determined whether an incident light 218 is returned by repeatedly reflecting in the transparent microsphere 216 and the interference substance layer 222 based on refractive index difference between the transparent microsphere 216 and the interference substance 222, or whether the incident light 218 is returned by reflecting at a reflective substrate 212.

A colored returned light can be obtained even when the incident light goes through the interference substance layer 222 and is reflected by the reflective substrate 212, because the so-called transmissive interference light is generated at the time that the incident light goes through the interference substance layer 222.

Embodiment 2-5

In the present embodiment, the retroreflective material described in the embodiment 1-5 is used as the retroreflective layer. The retroreflective layer is explained with referring to FIG. 5.

In a retroreflective layer 310 shown in FIG. 5, an interference substance layer 322 is directly arranged onto a reflective substrate 312. Then, a specific color tone can be obtained by interference action of a reflected light 320a, which is reflected at the surface of the interference substance layer 322 and a reflected light 320b, which is reflected at the reflective substrate 312.

Embodiment 2-6

In the present embodiment, the retroreflective material described in the embodiment 1-6 is used as the retroreflective layer. The retroreflective layer is explained with referring to FIG. 6.

In a colored light retroreflective material 410 shown in FIG. 6, an interference substance layer 422 is formed onto the buried face of a resin layer 414 that a transparent microsphere 416 is buried. In this case, a reflective layer 440 is arranged on the periphery of the interference substance layer 422. Accordingly, a specific color tone can be obtained by interference action of a reflected light 420a, which is reflected at the boundary surface between the transparent microsphere 416 and the interference substance layer 422, and a reflected light 420b, which is reflected at the reflective layer 440.

As explained about the retroreflective material, it is preferable to use the titanium dioxide coated mica, which is typical of a coherent plate-like powder, as the interference substance used in the embodiments 2-1 to 2-4.

Accordingly, as the plate-like powder which is a nucleus of this coherent plate-like powder, for example, powders such as metal-aluminium, metal titanium or stainless; an inorganic plate-like oxide such as plate-like iron oxide, plate-like silica, plate-like titanium oxide or plate-like alumina, a layer-like compound such as muscovite, biotite, sericite, kaolinite or talc, or an organic high polyinerized foil such as PET resin film or acrylic resin film is included. However, the plate-like powder used in the present invention is not limited to these powders. It is preferable to use the plate-like powder that has light transmittance in order to improve utilization efficiency of light. Also, a particle diameter of the plate-like powder which is used in the present invention is not limited in particular. However, the powder whose diameter is preferably 1 to 200 μm, and more preferably, is 10 to 120 μm, and which is flat, is easy to display an excellent luster and interference color.

For the purpose of giving an interference color to these plate-like powders, it is general to coat a metal oxide onto the surface of the plate-like powder. Examples of the metal oxide include titanium dioxide, iron oxide, titanium lower oxides, zirconium oxide, silicon oxide, aluminium oxide, cobalt oxide, nickel oxide, cobalt titanate or the like, the composite oxide such as $Li_2CoTi_3O_8$ or $KNiTiO_x$, or the mixed compounds thereof However, the metal oxide is not limited to these compounds as long as the metal oxide can develop an interference color. A method for coating these metal oxides onto the plate-like powder can be effected by the method to heat or decomposition with neutralization an organic salt or an inorganic salt of these metal oxides or evaporation coating method such as CVD or PVD.

Surface treatment can be effected on the surface of these coherent plate-like powders with organic or inorganic compound as occasion demands. Further, the application of the coherent plate-like powder used in the present invention is not restricted in particular. Combination with a conventional coloring agent or adding order can be adopted at will as long as the interference color is developed.

Also, as explained about the retroreflective material, a metal film, which has an interference color obtained by oxidizing the surface of the metal film, can be used as the interference substance layer used in the embodiments 2-5 and 2-6. The metal film is manufactured by the method such as a method for anodizing metal aluminium, metal titanium or stainless film; a method for coating the metal oxide which can develop the interference color and which is prepared with sol-gel process, a method that an alkoxide of a metal that can develop the interference color is coated to the metal film, and followed by thermolyzing the metal film; or evaporation coating method such as CVD or PVD.

As mentioned above, the retroreflective layer in accordance with the present invention, that is excellent in utilization efficiency of light colored with the interference color, can provide the hologram reconstructor with high forgery prevention property, design function, and decorating function.

Also, describing the letter or the figure with the color of the interference color that the interference substance displays can provide the higher forgery prevention property.

Examples of the hologram reconstructor in accordance with the present invention will be explained in the following.

EXAMPLE 2-1

Onto the carrier of polyethylene terephthalate whose thickness was 25 μm, was arranged a protective/peeling layer that were combined together, whose thickness was 0.5 μm and that was made of cellulose acetate. A hologram layer whose thickness was 2.5 μm and that was made of acrylic resin, was arranged onto the protective/peeling layer. A mold that hologram ruggedness was marked, was pressured and adhered with respect to a resin face of the hologram layer and was hardened by irradiating electron beam. Further, aluminium was half-evaporated as a reflective layer. A coating layer whose thickness was 12 μm and that was made of PET resin was arranged onto the reflective layer. Silicone resin solution was applied onto the whole part of the coating layer. A transparent glass microsphere that its refractive index was 1.9 and it had 200 to 250 meshes was scattered when the silicone resin solution was dried to the degree that the silicone resin solution was not flowed. After adhering and drying the transparent glass microsphere in single that its hemisphere might not be buried, the glass microsphere was provisionary adhered with heat treatment for 3 minutes at 120° C. Then, a pattern was printed by screen printing onto the glass microsphere provisional adhesion surface that the above-mentioned transparent glass microsphere was provisionary adhered to the film by transparent color screen printing ink which comprises green interference titanated mica of manufacturing example 1-1 according to the ratio of TABLE 5. Before the pattern was dried, nylon resin particle of 80 to 250 meshes was scattered, adhered and dried. Heat treatment was effected for 5 minutes or more at 140° C., thereby yielding a retroreflective hologram reconstructor film (transcriptional film) that displayed green reflected light which was the same color with the interference color of green interference titanated mica.

TABLE 5

| | |
|---|---|
| Acrylic resin solution (45 w/w %) | 100 parts |
| Green interference titanated mica of Manufacturing Example 1-1 (particle size 10 to 60 μm) | 30 parts |
| Other additions | |

EXAMPLE 2-2

Onto the carrier of polyethylene terephthalate whose thickness was 25 μm, was arranged a protective/peeling layer that were combined together, whose thickness was 0.5 μm and that was made of cellulose acetate. A hologram layer whose thickness was 2.5 μm and that was made of acrylic resin, was arranged onto the protective/peeling layer. A mold that hologram ruggedness was marked, was pressured and adhered with respect to a resin face of the hologram layer and was hardened by irradiating electron beam. Titanium dioxide was further evaporated as a transparent reflective layer. Further, aluminium was half-evaporated as a reflective layer. Silicone resin solution was applied onto the whole part of the reflective layer. A transparent glass microsphere that its refractive index was 1.9 and it had 200 to 250 meshes was scattered when the silicone resin solution was dried to the degree that the silicone resin solution was not flowed. After adhering and drying the transparent glass microsphere in single that its hemisphere might not be buried, the glass microsphere was provisionary adhered with heat treatment for 3 minutes at 120° C. Then, a pattern was printed by screen printing onto the glass microsphere provisional adhesion surface that the above-mentioned transparent glass microsphere was provisionary adhered to the film by transparent color screen printing ink according to the ratio of TABLE 6. Aluminium was vacuum evaporated onto the film so as that the thickness of the film become 80 nm. Acrylic resin solution was further applied onto the surface of the film. Before the solution was dried, nylon resin particle of 80 to 250 meshes was scattered, adhered and dried. Heat treatment was effected for 5 minutes or more at 140° C., thereby yielding a retroreflective hologram reconstructor film (transcriptional film) that displayed blue green reflected light which was the similar color with the appearance color (interference color) of titanium lower oxides/titanium dioxide coated mica.

TABLE 6

| | |
|---|---|
| Acrylic resin solution (45 w/w %) | 100 parts |
| Blue green low order titanium oxide/titanium dioxide coated mica of Manufacturing Example 1-2 (particle size 10 to 60 μm) | 30 parts |
| Other additions | |

EXAMPLE 2-3

Onto the carrier of polyethylene terephthalate whose thickness was 25 μm, was arranged a protective/peeling layer that were combined together, whose thickness was 0.5 μm and that was made of cellulose acetate. A hologram layer whose thickness was 2.5 μm and that was made of acrylic resin, was arranged onto the protective/peeling layer. A mold that hologram ruggedness was marked, was pressured and adhered with respect to a resin face of the hologram layer and was hardened by irradiating electron beam. Further, aluminium was half-evaporated as a reflective layer. A coating layer whose thickness was 12 μm and that was made of PET resin was arranged onto the reflective layer. Silicone resin solution was applied onto the whole part of the coating layer. A transparent glass microsphere that its refractive index was 1.9 and it had 200 to 250 meshes was scattered when the silicone resin solution was dried to the degree that the silicone resin solution was not flowed. After adhering and drying the transparent glass microsphere in single that its hemisphere might not be buried, the glass microsphere was provisionary adhered with heat treatment for 3 minutes at 120° C. A pattern was printed by screen printing onto the glass inicrosphere provisional adhesion surface that the above-mentioned transparent glass microsphere was provisionary adhered to the film by transparent color screen printing ink which comprised a glossy powder of vivid yellow appearance color and red interference color according to the ratio of TABLE 7.

Then, aluminium powder of average particle diameter 20 μm was coated onto the printing surface with acrylic coating by an applicator whose clearance was 0.101 mm. Acrylic resin solution was further coated onto the printing surface, and nylon resin particle of 80 to 250 meshes was scattered, adhered and dried before the solution was dried. Heat treatment was effected for 5 minutes or more at 140° C., thereby yielding a retroreflective hologram reconstructor (transcriptional film) that displayed yellow appearance and red retroreflective light.

TABLE 7

| | |
|---|---|
| Acrylic resin solution (45 w/w %) | 100 parts |
| Glossy powder which have yellow appearance and red interference color of Manufacturing Example 1-5 (particle size 10 to 60 μm) | 30 parts |
| Other additions | |

EXAMPLE 2-4

100 g of transparent glass microsphere that its refractive index was 1.9 and it had 200 to 250 meshes was dispersed into 1000 ml of isopropyl alcohol and 150 g of titanium tetraisopropoxide solution was added to the dispersed solution. Then, 100 ml of the mixed solution of water/isopropyl alcohol (1:1) was dripped down at the velocity of 5 ml/min, while the dispersed solution was maintained at 30° C. After dripping the mixed solution, the mixture was stirred for 4 hours. Then, the mixture was separated by filtration and washed with water. A transparent glass microsphere which had yellow interference color was obtained by drying the mixture for 3 hours at 200° C. Onto the carrier of polyethylene terephthalate whose thickness was 25 μm, was arranged a protective/peeling layer that were combined together, whose thickness was 0.5 μm and that was made of cellulose acetate. A hologram layer whose thickness was 2.5 μm and that was made of acrylic resin, was arranged onto the protective/peeling layer. A mold that hologram ruggedness was marked, was pressured and adhered with respect to a resin face of the hologram layer and was hardened by irradiating electron beam. Titanium dioxide was evaporated as a transparent reflective layer. Further, aluminium was half-evaporated. A coating layer whose thickness was 12 μm and that was made of PET resin was arranged onto the reflective layer. Silicone resin solution was applied onto the whole part of the coating layer. Then, the transparent glass microsphere, which had yellow interference color and was manufactured in advance, was scattered when the silicone resin solution was dried to the degree that the silicone resin solution was not flowed. After adhering and drying the transparent glass microsphere in single that its hemisphere might not be buried, the glass microsphere was provisionary adhered with heat treatment for 3 minutes at 120° C. A pattern was printed by screen printing onto the glass microsphere provisional adhesion surface that the above-mentioned transparent glass microsphere was provisionary adhered to the film by transparent color screen printing ink which comprised titanated mica of manufacturing example 2-4. Before the pattern was dried, nylon resin particle of 80 to 250 meshes was scattered, adhered and dried. Heat treatment was effected for 5 minutes or more at 140° C., thereby yielding a retroreflective hologram reconstructor (transcriptional film) that displayed yellow reflected light.

In the present example, though a method that the retroreflective layer was formed on the hologram sheet was used, but the present invention is not limited to the method. The effect of the present invention can be obtained by, for example, a method that forms the coating layer, the reflective layer, the hologram layer and the protective layer, after forming the retroreflective layer by forming the interference substance layer on the substrate and by scattering the transparent glass particle thereupon or a method to adhere the hologram sheet, which was laminated in advance, onto the place that the retroreflective layer of the present invention was formed.

In order to see clearly interference color of the interference substance when a linear is irradiated to the hologram reconstructor, the refractive index of transparent glass microsphere which is used in the retroreflective material is preferably from 1.7 to 2.2, and more preferably, is from 1.8 to 2.1, and the average diameter of one is preferably from 20 to 60 μm, and more preferably, is from 30 to 50 μm.

In the case of using the transparent glass microsphere, which has bigger refractive index than 2.2 or smaller refractive index than 1.7, it is difficult to control a focus of the hologram reconstructor. So we can not see a clearly reflected light from interference substance in this case. Also in the case of using the transparent glass microsphere, which has smaller average diameter than 20 μm, the microsphere may be buried in a resin layer, and reduces the effective angle of incidence that the hologram reconstructor of the present invention is able to reflect a incident light to the nearly same course. Conversely, in the case of using the transparent glass microsphere, which has bigger average diameter than 60 μm, it is difficult to control a focus, and leads to the problem that the ink enter the gaps among the above microsphere, and so. And in the case of using the transparent glass microsphere, which has bigger average diameter than 60 μm, in the hologram reconstructor of the present invention occurs problem that printing onto the above microsphere is hard, when a interference substance is printed by screen printing onto the glass microsphere like above mentioned examples.

In the hologram reconstructor of the present invention, the thickness of the hologram layer is preferably from 20 to 75 μm, and more preferably, is from 23 to 50 μm. In the case of using the hologram layer, which has thicker thickness than 75 μm, declines the ability of security. In the opposite direction, the hologram layer, which has thinner thickness than 20 μm, is so soft that producing the hologram reconstructor of the present invention is difficult.

The hologram reconstructor of the present invention is composed of mentioned above the retroreflective material of the present invention and a hologram reconstructor like a hologram film. It is said that to copy a hologram reconstructor is very hard. Consequently, when the hologram reconstructor of the present invention is used in any product, to copy the any product is very hard although used a copy machine. And the linear light is irradiated to the part, which is the hologram reconstructor of the present invention, of any product by using the linear light irradiation machine that proceeds linear light. Then any product, which is used the hologram reconstructor of the present invention, can be distinguished between the original and the counterfeit instantly. Because the hologram reconstructor of the present invention displays different color under the normal light or the linear light, we can check up on the letter, figure, or color which appears at the time of the linear light is irradiated.

As explained above, the hologram reconstructor in accordance with the present invention can widely select the color tone and is excellent in utilization efficiency, because the reconstructor was made to give a color tone by interference action with the incident lights.

Also, when the substrate is comprised in the retroreflective layer in the hologram reconstructor of the present invention, the color tone, which was synthesized with the color of the substrate and the interference color was observed from the returning direction of the linear light, and the color of the substrate was observed from the other direction, by using titanium dioxide coated mica or titanium lower oxides coated mica which has high light transmittance as the interference substance and by coloring the substrate. Accordingly graphical design function can be improved.

Also, in the hologram reconstructor in accordance with the present invention, the color tone, which was synthesized with the color of the composite oxide and the interference color was observed from the returning direction of the linear light, and the color of the composite oxide was observed from the other direction, by using titanium composite oxide coated mica as the interference substance. Accordingly graphical design function can be improved.

Also, in the present invention, a pattern can be came into the surface only when the linear light is irradiated, because to describe a letter or a figure with a difference of the interference light which displays with respect to the incident light by operating the position of the interference substance. Therefore, graphical design function and forgery prevention property can be improved.

What is claimed is:

1. A colored light retroreflective material which synthesizes an incident light by giving a phase contrast to a part of the incident light, and emphasizes a light component of a specific wavelength region by interference and returns a colored light that the color tone is different from the incident light to the incident direction of the light.

2. A colored light retroreflective material according to claim 1, which comprises a reflective substrate and a transparent microsphere that is arranged onto said substrate in order, wherein, an interference substance layer, which produces a colored interference color, is arranged onto said reflective substrate.

3. A colored light retroreflective material according to claim 2, wherein a metal oxide coated plate-like powder is used as the interference substance layer.

4. A colored light retroreflective material according to claim 3, wherein said metal oxide coated plate-like powder is a titanium dioxide coated mica and/or a titanium lower oxides coated mica that the layer thickness of the titanium oxide is 40 nm or more.

5. A colored light retroreflective material according to claim 4, wherein said reflective substrate has a color that is different from the color tone of the interference color of the titanium oxide coated mica.

6. A colored light retroreflective material according to claim 3, wherein said metal oxide coated plate-like powder is a titanium composite oxide coated mica that has a different appearance color from the color tone of the interference color of the metal oxide coated plate-like powder.

7. A colored light retroreflective material according to claim 2, wherein a surface oxidizing metallic membrane is used as the interference substance layer.

8. A colored light retroreflective material according to claim 1, which comprises a reflective substrate and a transparent microsphere that is arranged onto said substrate in order, wherein, an interference substance layer is arranged onto an opposite face to the substrate of said transparent microsphere.

9. A retroreflective hologram reconstructor which laminates the retroreflective material that is described claim 1 and a hologram reconstructor that reconstructs a three-dimensional image by laminating a hologram layer and a reflective layer.

10. A retroreflective hologram reconstructor as in claim 9, wherein a letter or a figure is described with a difference of an interference color that displays with respect to an incident light by operating the position of the interference substance layer.

11. A retroreflective hologram reconstructor according to claim 10, wherein the letter or the figure described with the interference substance and a hologram image which is reconstructed by the hologram layer are different in each other.

12. A retroreflective hologram reconstructor, which laminates the retroreflective material of claim 1 and a hologram reconstructor that reconstructs a three-dimensional image by laminating a hologram layer, and a reflective layer, wherein, said retroreflective material comprises an interference substance layer which produces a colored interference color and a transparent microsphere which is arranged onto said interference substance layer in order.

13. A retroreflective hologram reconstructor according to claim 12, wherein a metal oxide coated plate-like powder is used as the interference substance layer.

14. A retroreflective hologram reconstructor according to claim 13, wherein said metal oxide coated plate-like powder is a titanium dioxide coated mica and/or a titanium lower oxides coated mica that the layer thickness of the titanium oxide is 40 nm or more.

15. A retroreflective hologram reconstructor according to claim 14, wherein said metal oxide coated plate-like powder is a titanium composite oxide coated mica that has a different appearance color from the color tone of the interference color of the metal oxide coated plate-like powder.

16. A retroreflective hologram reconstructor according to claim 12, wherein a surface oxidizing metallic membrane is used as the interference substance layer.

* * * * *